J. DANA
Cotton-Seed Planters
No. 152,611.           Patented June 30, 1874.
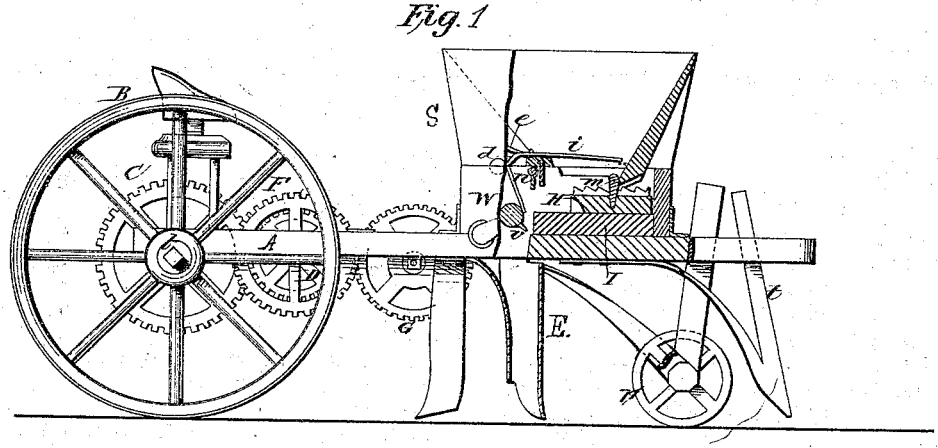
Fig. 1
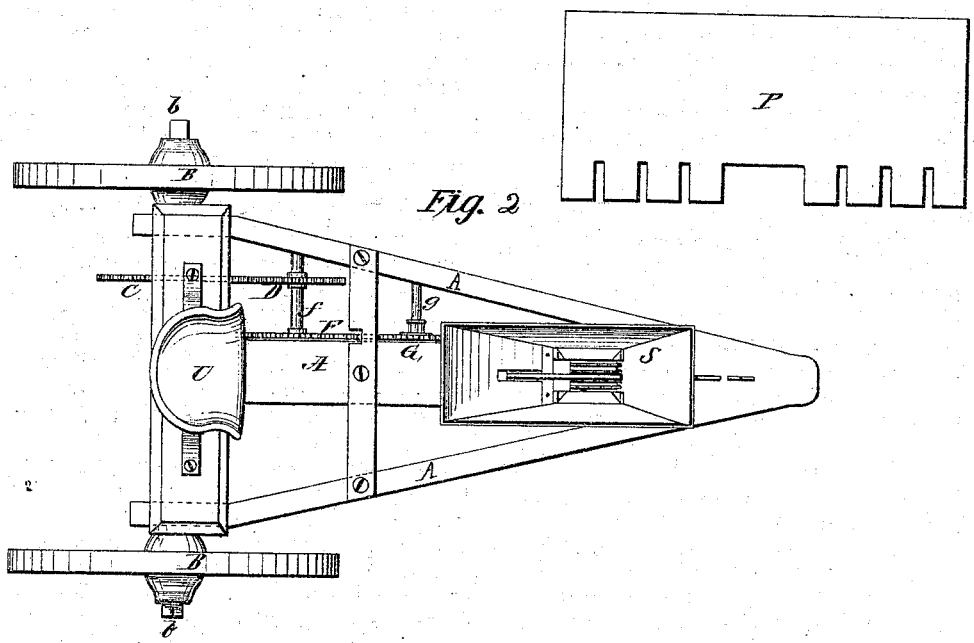
Fig. 2
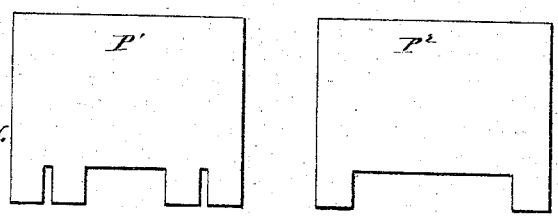
Witnesses.
W. E. Chaffee
Harry Coleman
Inventor.
Joseph Dana
by A. M. Stout
his attorney

UNITED STATES PATENT OFFICE.

JOSEPH DANA, OF MITCHELL, INDIANA, ASSIGNOR OF THREE-FOURTHS HIS RIGHT TO EDWARD P. HAMILTON, JOHN TOLIVER, AND JOSEPH I. TOLIVER, OF SAME PLACE.

IMPROVEMENT IN COTTON-SEED PLANTERS.

Specification forming part of Letters Patent No. 152,611, dated June 30, 1874; application filed May 19, 1874.

*To all whom it may concern:*

Be it known that I, JOSEPH DANA, of Mitchell, Lawrence county, Indiana, have invented Improvements in Cotton-Seed Planter, of which the following is a specification:

My invention relates to an improved construction and arrangement of devices to secure the delivery of the cotton-seed from the hopper into the discharge-spout, and to the overcoming of difficulties in that operation resulting from a small portion of the fibers of the cotton remaining upon the seed, and thus causing the seed to adhere and become massed and matted together. This matting together must be broken up, or else the seed cannot be delivered from the hopper to the spout in regularly-graduated quantities.

My said improvements are hereinafter described with reference to the accompanying drawings, in which—

Figure 1 is a side elevation, partly in section, of a cotton-seed planter embracing my improvements; Fig. 2, a top or plan view thereof; and P, P$^1$, and P$^2$ are face views of feed-regulating plates, which will be further described hereinafter.

A A A A indicate the frame of the machine, B B its carrying-wheels, b their axle-tree, and U the driver's seat. C is a gear-wheel fixed upon the axle-tree b, and meshes with a like wheel, D, on the spindle f, journaled in the frame; and F is another like wheel, fixed also upon the spindle f, and meshes with another like wheel, G, fixed upon the spindle g, which is also journaled in the frame. By means of these several gear-wheels motion is transmitted from the axle-tree b to the delivering devices. I is a block attached to the bottom of the hopper S, and upon that block is placed the slide-block H, which, by appropriate mechanism—namely, a crank and a crank-pin, which moves in a horizontal slot in the side of the hopper, which crank is attached to and turned by a horizontal shaft with a pinion upon it—is made to reciprocate horizontally, and in doing so it draws away a quantity of seed from the mass in the hopper, and delivers them into the discharge-spout E; and in order that the sliding block may perform this function more successfully it is provided with several notched bars, which are embedded therein lengthwise of the same, and also with a valve, as shown, to prevent any of the seed from being carried back into the hopper after having been once drawn out.

All this delivery mechanism is fully shown and described in the Letters Patent of the United States issued to me for "Improvement in Cotton-Seed Planters," dated March 3, 1874, No. 148,186.

Now, the invention sought to be secured by this application consists of two parts, the first part of which is the stirrer $i$, provided with a spring, $e$, the force of which presses it constantly downward, and provided with the foot or trip $n$, and mounted and fixed upon the shaft $d$ in the hopper, in combination with the revolving shaft W, provided with a trip, $v$, likewise mounted in the hopper; and when the shaft W revolves, as the machine moves forward, its trip $v$, by its action on foot $n$, causes the stirrer $i$ to rise up gradually through the mass of cotton-seed once in every revolution, and then, after being freed from the trip $v$, it is forced, by its spring, quickly down upon the seed again, so that the sliding block H can act effectually upon it. Thus packing is prevented, and the seed are held to the bottom of the hopper.

The second part of my invention consists of the regulating plate P, in combination with the hopper S and sliding block H, provided with the notched bars before mentioned. This plate is made of such width and shape that it will slide down on the inside of the rear end of the hopper until its lower end is nearly in contact with the upper surface of the sliding block, and it may be fastened to the hopper and in position by set-screw or any other suitable means, and the notches in the lower end of the plate are made of such depth and width that the notched bars will pass through them without touching when the sliding block is reciprocated. In the lower edge of the plate P a central space without teeth, to extend between the notched bars, is left open for the seed to pass through; and by having a series of these plates with such central openings of various widths, such as P, P¹, and P², the operator can increase or diminish the feed to the spout at will.

Having thus fully described my invention, what I claim as my invention, and desire to secure by Letters Patent, is—

1. In a cotton-seed planter, the stirrer and compresser $i$, having the foot or trip $n$ mounted on the spindle $d$, the spring $e$, and the shaft W, provided with the trip $v$, in combination with the reciprocating block H, having notched bars $m$, each constructed, and all arranged, substantially as shown and described, for the purpose specified.

2. In combination with the hopper S and the sliding rod H, provided with notched bars, as shown and described, the feed-regulating plate P, constructed and arranged substantially as and for the purpose specified.

JOSEPH DANA.

Witnesses:
ELIHU S. McINTIRE,
HENRY H. MOORE.